United States Patent
Wiegert et al.

(10) Patent No.: US 7,581,045 B2
(45) Date of Patent: Aug. 25, 2009

(54) METHOD, SYSTEM, AND ARTICLE OF MANUFACTURE FOR MAPPING PROGRAMMING INTERFACES

(75) Inventors: John A. Wiegert, Aloha, OR (US); Stephen D. Goglin, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 716 days.

(21) Appl. No.: 11/152,856

(22) Filed: Jun. 14, 2005

(65) Prior Publication Data
US 2006/0280171 A1    Dec. 14, 2006

(51) Int. Cl.
G06F 3/00    (2006.01)
G06F 5/00    (2006.01)
G06F 9/45    (2006.01)
G06F 15/177    (2006.01)
G06F 15/16    (2006.01)

(52) U.S. Cl. .............. 710/61; 703/24; 703/25; 703/26; 703/27; 709/220; 709/201; 710/20; 710/52

(58) Field of Classification Search .............. 710/52, 710/20, 61; 703/24, 25, 26, 27; 709/220, 709/201
See application file for complete search history.

(56) References Cited

U.S. PATENT DOCUMENTS

| | | | | |
|---|---|---|---|---|
| 4,642,789 A * | 2/1987 | Lavelle | ............... | 345/537 |
| 5,687,347 A * | 11/1997 | Omura et al. | ............... | 711/112 |
| 6,012,081 A * | 1/2000 | Dorn et al. | ............... | 718/102 |
| 6,068,661 A * | 5/2000 | Shari | ............... | 703/27 |
| 6,721,288 B1 * | 4/2004 | King et al. | ............... | 370/310 |
| 2003/0097401 A1 * | 5/2003 | Bauman et al. | ............... | 709/203 |
| 2003/0101291 A1 * | 5/2003 | Mussack et al. | ............... | 709/328 |
| 2004/0199677 A1 * | 10/2004 | Goode et al. | ............... | 710/1 |

OTHER PUBLICATIONS

IBM, "Multiple concurrent read input/output stream's allocating and managing method, involved doubling prefetch quantity to determine number of buffers required by input/output stream, where prefetch quantity is adjusted dynamically" May 10, 2001.*

* cited by examiner

*Primary Examiner*—Alford W Kindred
*Assistant Examiner*—Farley J Abad
(74) *Attorney, Agent, or Firm*—Konrad Raynes & Victor LLP; Rabindranath Dutta

(57) ABSTRACT

Provided are a method, system, and article of manufacture for mapping programming interfaces. A synchronous request for reading data is received. An asynchronous request to fill selected buffers of a plurality of buffers is sent. The synchronous request is responded to with the data from at least one buffer of the plurality of buffers.

16 Claims, 5 Drawing Sheets

METHOD, SYSTEM, AND ARTICLE OF MANUFACTURE FOR MAPPING PROGRAMMING INTERFACES

BACKGROUND

In software systems that support an asynchronous application programming interface (API), an application may issue an asynchronous read request and perform other tasks. While executing the other tasks, the application may be notified that the data corresponding to the asynchronous read request is available. The application may then retrieve the data.

In software systems that support a synchronous API, an application may issue a synchronous read request. If the data corresponding to the synchronous read request is not currently available, then the application may enter into a wait state in which no other task is performed by the application. After being notified that the data corresponding to the synchronous read request is available, the application may retrieve the data and exit from the wait state.

Synchronous and asynchronous APIs may be used to issue other requests that are different from read requests, such as, write requests, append requests, delete requests, other Input/Output (I/O) requests, etc. If the request is asynchronous then the calling application does not wait while the request is pending, whereas if the request is synchronous then the calling application waits while the request is pending.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

Certain embodiments provide a mapping application that maps synchronous API calls to asynchronous API calls. In certain embodiments, a first application may generate a synchronous read request and the mapping application may map the synchronous read request to an asynchronous read request directed towards a network stack. The mapping application may use the asynchronous read request to fetch an additional amount of data from the network stack that is more than the amount of data requested by the first application. Subsequent read requests from the first application may be responded to from the mapping application from the additional amount of data that may have already been fetched.

Figure 1:
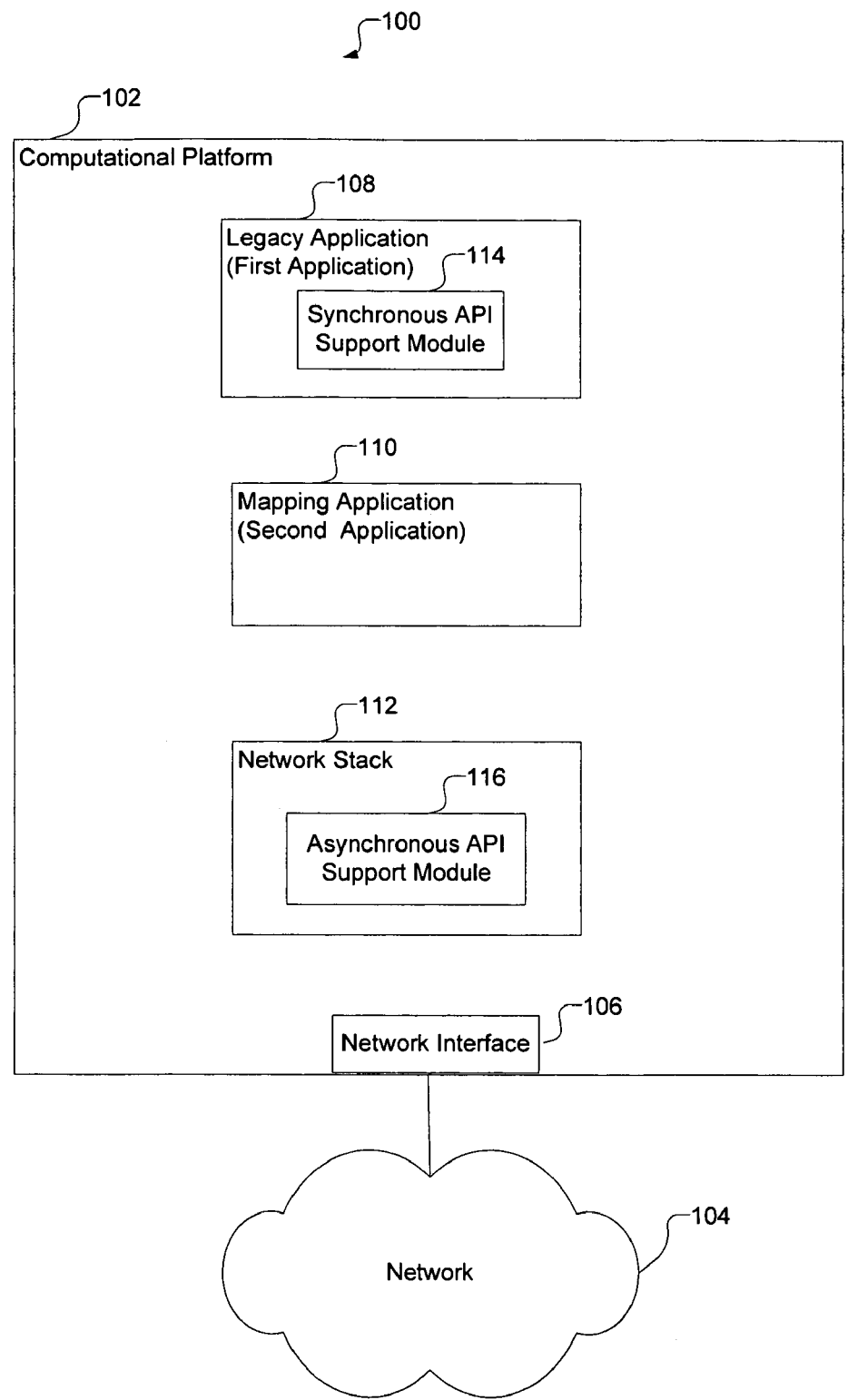
FIG. 1 illustrates a computing environment, in accordance with certain embodiments.

FIG. 1 illustrates a computing environment 100, in accordance with certain embodiments. A computational platform 102 is coupled to a network 104 via a network interface 106. The computational platform 102 may send and receive packets from other devices (not shown) through the network 104.

The computational platform 102 may be any suitable device including those presently known in the art, such as, a personal computer, a workstation, a server, a mainframe, a hand held computer, a palm top computer, a telephony device, a network appliance, a blade computer, a storage server, etc. The network 104 may comprise the Internet, an intranet, a Local area network (LAN), a Storage area network (SAN), a Wide area network (WAN), a wireless network, etc. The network 104 may be part of one or more larger networks or may be an independent network or may be comprised of multiple interconnected networks. The network interface 106 may send and receive packets over the network 104. In certain embodiments the network interface 106 may include a network adapter.

In certain embodiments, the computational platform 102 may comprise a first application, such as, a legacy application 108, a second application, such as, a mapping application 110, and a network stack 112 for communication with the network interface 106.

The legacy application 108 may provide support for synchronous APIs via a synchronous API support module 114 that may support socket APIs for network communications. The legacy application 108 does not provide support for asynchronous APIs. After generating a synchronous API call, the legacy application 108 that uses the synchronous API support module 114 waits until the response to the synchronous API call is made available to the legacy application 108, i.e., a thread in the legacy application that generates the synchronous API call cannot perform any other task while the thread waits.

In certain embodiments, the mapping application 110 receives a synchronous API call from the legacy application 108 and maps the synchronous API call to an asynchronous API call for the network stack 112 and proceeds to perform other tasks. If the synchronous API call is a synchronous read request, then the mapping application 110 responds to the synchronous read request with the corresponding data.

In certain embodiments, where the network interface 106 is a network adapter, the network stack 112 may provide an interface for allowing communications through the network adapter. The network stack 112 may provide support for asynchronous APIs via an asynchronous API support module 116 that supports socket APIs for network communications. Applications that call the network stack 112 asynchronously may be able to utilize the support for asynchronous processing provided by the network interface 106 corresponding to the network stack 112. In certain embodiments, support for asynchronous APIs may increase the performance of the computational platform 102 as asynchronous processing allows the calling application to perform other tasks without waiting for a response.

FIG. 1 illustrates certain embodiments in which even though the network stack 112 provides support for asynchronous APIs, the legacy application 108 is unable to directly use the support for asynchronous APIs as the legacy application 108 supports synchronous APIs. The mapping application 110 maps the synchronous APIs of the legacy application 108 to the asynchronous APIs of the network stack 112. The asynchronous API support provided by the network stack 112 is exploited by the mapping application 110.

Figure 2:
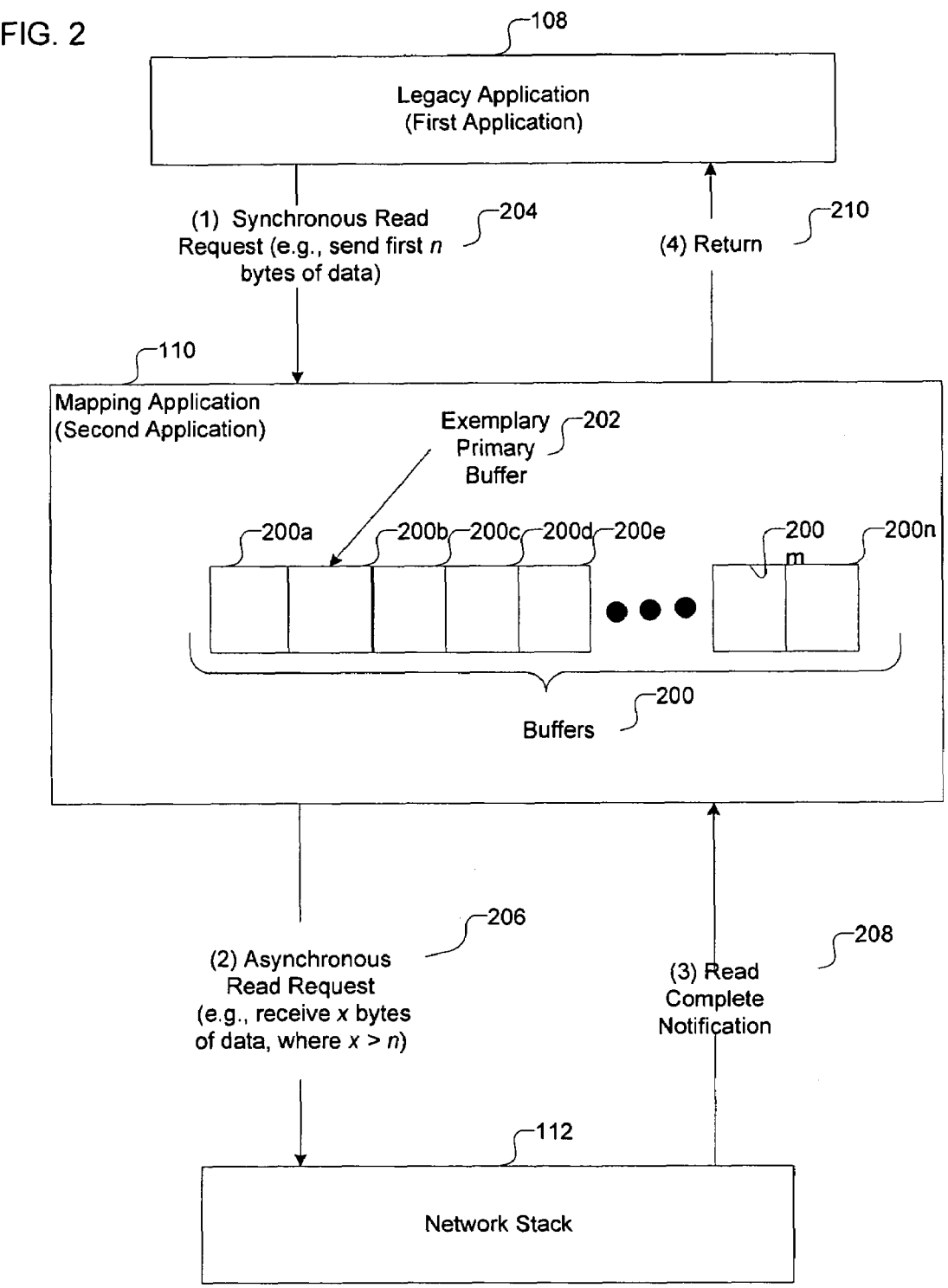
FIG. 2 is illustrates the mapping of synchronous read requests to asynchronous read requests in the computing environment of FIG. 1, in accordance with certain embodiments.

FIG. 2 illustrates the mapping of synchronous read requests to asynchronous read requests in the computing environment 100 of FIG. 1, in accordance with certain embodiments.

The mapping application 110 includes a plurality of buffers 200, such as, buffers 200a, 200b, 200c, 200d, 200e, ..., 200m, 200n. A buffer may be capable of storing a certain number of bytes of data. For example, buffer 200a may be capable of storing 512 bytes of data. One buffer of the plurality of buffers 200 is designated as a primary buffer. For example, in FIG. 2 buffer 200b is designated as an exemplary primary buffer 202. The buffer designated as the primary buffer is the first buffer whose data is returned by the mapping application 110 to the legacy application 108, in response to a read request from the legacy application 108. The buffers 200 may be arranged in sequence, such as 200a, 200b, 200c, 200d, ..., 200m, 200n, where after the data of the primary buffer has been returned to the legacy application 108, the next buffer is designated as the primary buffer. After the last buffer 200n is designated as the primary buffer, the next buffer to be designated as the primary buffer is first buffer 200a, i.e., buffers 200a ... 200n form a circular buffer.

In certain embodiments the legacy application 108 generates a synchronous read request 204 to the mapping application 110. The synchronous read request 204 may request the mapping application 110 to send the first n bytes of data available at the mapping application 110. The mapping application 110 may interpret the first n bytes of data to start at the designated primary buffer 202, where the first n bytes of data may span a plurality of buffers. For example, if the legacy application 108 requests 1024 bytes of data, and the exemplary primary buffer 202, i.e., buffer 200b, includes 512 bytes of data, and the next buffer to the primary buffer 202 also includes 512 bytes of data, then data from two buffers 200b, 200c may be returned to the legacy application 108.

In response to receiving the synchronous read request 204, the mapping application 110 generates an asynchronous read request 206 to the network stack 112, where the asynchronous read request 206 may request from the network stack 112 a greater number of bytes than the number of bytes requested by the legacy application 204. The number of bytes requested from the network stack 112 may be adjusted dynamically. The asynchronous read request 206 may be generated whether or not the data requested by the legacy application 108 is present in the buffers 200. If the data requested by the legacy application 108 is present in the buffers 200, then the legacy application 108 does not have to wait, whereas if the data requested by the legacy application 108 is not present in the buffers 200, then the legacy application 108 has to wait at least until the data is filled into the buffers 200 by the network stack 112.

In certain embodiments, the legacy application 108 may request n bytes from the mapping application 110, whereas the mapping application may request x bytes from the network stack 112, where x>n. For example, while the data requested by the legacy application 108 may be designated for inclusion in buffers 200b, 200c, the mapping application 110 may also fetch buffers 200d, 200e in anticipation of a future requirement of data by the legacy application 108, i.e., the mapping application 110 prefetches data. Subsequent synchronous read request 204 from the legacy application 108 may be satisfied with data already present in the buffers 200, and the legacy application 108 may not have to wait because the request for data is satisfied from data available in the buffers 200 to the mapping application.

In certain embodiments, the amount of prefetched data to the buffers 200 can vary depending on system resources and other requirements. If the legacy application 108 is reading at a rate faster than the rate at which the buffers 200 are being filled, then a greater number of buffers may be used for prefetching data. As the rate at which buffers are being read decreases a fewer number of buffers may be used for prefetching data. The computing platform can dynamically adjust to suit the data requirements of the legacy application 108.

The network stack 112 receives the asynchronous read request 206 and may write the data to the buffers 200. While writing data to the buffers 200, the network stack 112 may write data to the buffers that have already been read by the legacy application 108 or to buffers that are empty. Subsequently, the network stack 112 sends a read complete notification 208 to the mapping application 110, where the read complete notification 208 indicates that the asynchronous read request 206 has been satisfied. In the time period between the generation of the asynchronous read request 206 and the receipt of the read complete notification 208 the mapping application 110 may perform other tasks.

If the legacy application 108 was waiting for the synchronous read request 204 to be satisfied, then the mapping application 110 sends a return 210 corresponding to the synchronous read request 204, where the return 210 includes the data for which the synchronous read request 204 was waiting. For example, in certain embodiments the legacy application 108 may have received part of the requested data from data stored in the buffers 220, but was waiting for the rest of the requested, data. The buffers whose data are returned to the legacy application 108 may be filled at a subsequent time by the network stack 112.

FIG. 2 illustrates an embodiment in which the network stack 112 stores data received from the network interface 106 in the plurality of buffers 200 of a mapping application 110, in response to asynchronous read requests 206 from the mapping application 110. The mapping application 110 maps synchronous read requests 204 from the legacy application to asynchronous read requests 206 for the network stack 112. Additionally, the mapping application 110 prefetches data from the network stack 112 anticipating future requirements of data from the legacy application 108.

Figure 3:
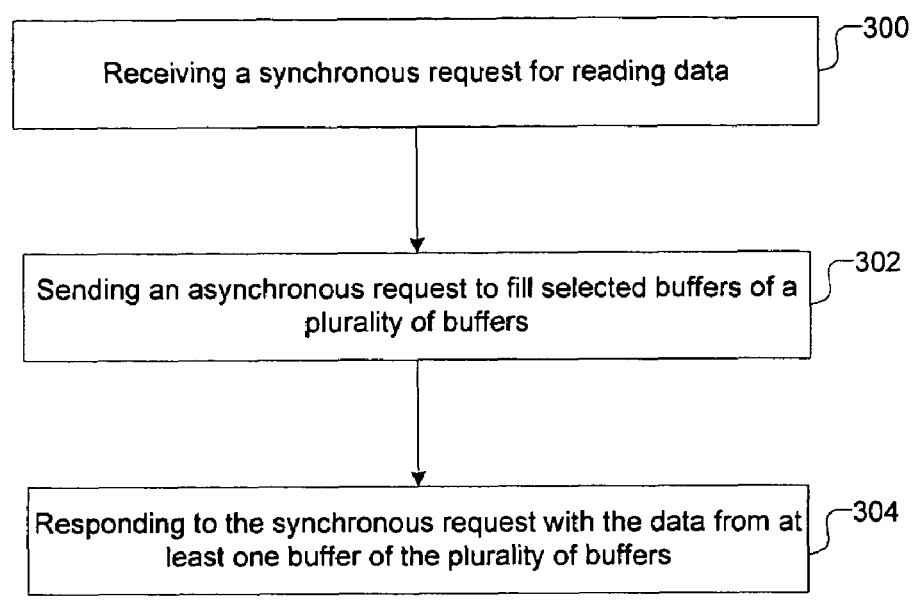
FIG. 3 illustrates first operations for mapping programming interfaces in the computing environment of FIG. 1, in accordance with certain embodiments.

FIG. 3 illustrates first operations for mapping programming interfaces in the computing environment 100 of FIG. 1, in accordance with certain embodiments. The first operations may be implemented in the mapping application 110.

Control starts at block 300, where the mapping application 110 receives a synchronous request 204 for sending data to a legacy application 108. In response to the synchronous request 204, the mapping application 110 sends (at block 302) an asynchronous request 206 to the network stack 112. In certain embodiments, the mapping application 110 may send the asynchronous request 206 to the network stack 112 whether or not the synchronous request 204 can be satisfied from data already stored in the buffers 200.

The mapping application 110 responds (at block 304) to the synchronous request 204 with the data from at least one buffer 202 of a plurality of buffers 200. In certain embodiments, the at least one buffer 202 is the primary buffer 202. Data from additional buffers may also be returned after data from the primary buffer 202 has been returned to the legacy application 108 and the next buffer has been designated as the primary buffer.

FIG. 3 illustrates certain embodiments in which the mapping application 110 maps synchronous read requests 204 from a legacy application 108 to asynchronous read requests 206 for a network stack 112. The mapping application 110 also prefetches data from the network stack 112 so that subsequent synchronous requests 204 from the legacy application 108 can be satisfied from data already stored in the buffers 200, such that the legacy application 108 does not have to wait.

Figure 4:
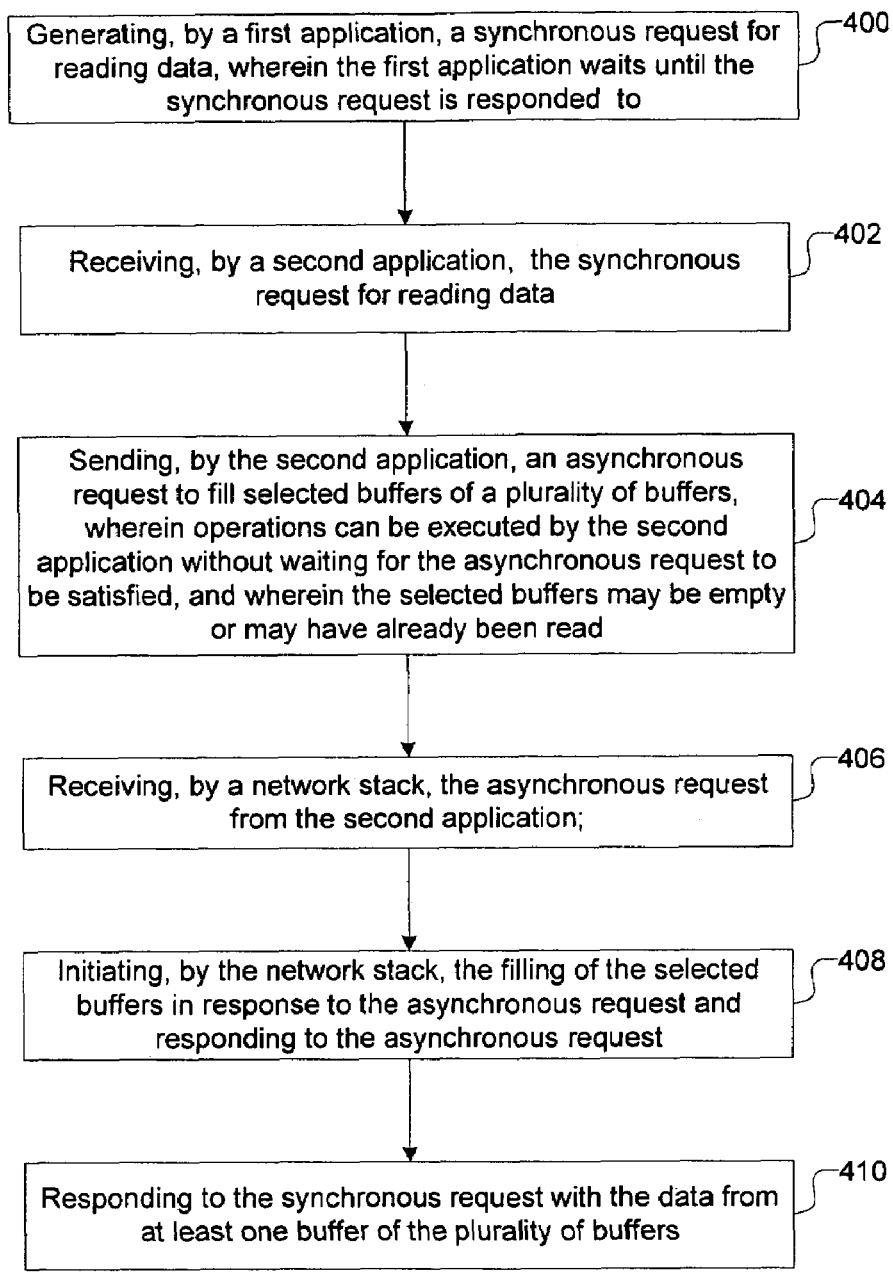
FIG. 4 illustrates second operations for mapping programming interfaces in the computing environment of FIG. 1, in accordance with certain embodiments.

FIG. 4 illustrates second operations for mapping programming interfaces in the computing environment 100 of FIG. 1, in accordance with certain embodiments. The second operations may be implemented in the computational platform 102 by a first application 108, such as, the legacy application, a second application 110, such as, the mapping application, and a network stack 112.

Control starts at block 400, where the first application 108, i.e., the legacy application, generates a synchronous request 204 for reading data, where the first application 108 waits until the synchronous request is responded to by the second application 110, i.e., the mapping application.

The second application 110, receives (at block 402) the synchronous request 204 for reading data. The data may or may not be present in the buffers 200 that are filled by the network stack 112.

The second application 110 sends (at block 404) an asynchronous request 206 to fill selected buffers of a plurality of buffers 200, where operations can be executed by the second application 110 without waiting for the asynchronous request 206 to be satisfied, and where the selected buffers may be empty or may have already been read. For example, the second application 110 may request the network stack 112 to fill selected buffers 200*b*, 200*c*, 200*d* where no data corresponding to the synchronous read 204 is present in the buffers 200. The selected buffers 200*b*, 200*c*, 200*d* may be either empty or may contain data that has been read previously by the legacy application 108.

The network stack 112, receives (at block 406) the asynchronous request 206 from the second application 110. The network stack 112 initiates (at block 408) the filling of the selected buffers in response to the asynchronous request, and responds to the asynchronous request. After the selected buffers have been filled the network stack 112 may send a read complete notification 208 to the mapping application.

The second application 110 responds (at block 410) to the synchronous request 204 with the data from at least one buffer of the plurality of buffers 200. The second application 110 may further respond with data from additional buffers beyond the at least one buffer if the synchronous read request from the first application 108 spans more than the at least one buffer.

FIG. 4 illustrates an embodiment in which a first application 108 sends a synchronous request 204 to a second application 110, and the second application 110 maps the synchronous request 204 to an asynchronous request 206 for a network stack 112. The second application 110 also prefetches data from the network stack 112 in anticipation of future data requirements of the first application 108.

In certain embodiments, the mapping application 110 may also receive the read completion notification 208 from the network stack 112 so that the state of buffers 200 may be changed from waiting to be filled to filled.

Certain embodiments reduce the time period that the legacy application 108 is blocked, i.e., waiting, to provide lower latency and lower processor utilization in the computing platform 102. The number of buffers 200 in use may be dynamically adjusted during runtime based on available resources and system load.

While FIGS. 1-4 have been illustrated with reference to a network stack 112, in alternative embodiments the mapping of the synchronous requests 204 to asynchronous requests 206 may be for other applications, such as, graphics processing and disk I/O.

The described techniques may be implemented as a method, apparatus or article of manufacture involving software, firmware, micro-code, hardware and/or any combination thereof. The term "article of manufacture" as used herein refers to program instructions, code and/or logic implemented in circuitry [e.g., in integrated circuit chip, Programmable Gate Array (PGA), Application Specific Integrated Circuit (ASIC), etc.] and/or a computer readable medium (e.g., magnetic storage medium, such as hard disk drive, floppy disk, tape), optical storage (e.g., CD-ROM, DVD-ROM, optical disk, etc.), volatile and non-volatile memory device (e.g., Electrically Erasable Programmable Read Only Memory (EEPROM), Read Only Memory (ROM), Programmable Read Only Memory (PROM), Random Access Memory (RAM), Dynamic Random Access Memory (DRAM), Static Random Access Memory (SRAM), flash, firmware, programmable logic, etc.). Code in the computer readable medium may be accessed and executed by a machine, such as, a processor. In certain embodiments, the code in which embodiments are made may further be accessible through a transmission medium or from a file server via a network. In such cases, the article of manufacture in which the code is implemented may comprise a transmission medium, such as a network transmission line, wireless transmission media, computer accessible signals propagating through space, computer accessible radio waves, computer accessible infrared signals, etc. Of course, those skilled in the art will recognize that many modifications may be made without departing from the scope of the embodiments, and that the article of manufacture may comprise any information bearing medium known in the art. For example, the article of manufacture comprises a storage medium having stored therein instructions that when executed by a machine results in operations being performed. Furthermore, program logic that includes code may be implemented in hardware, software, firmware or many combinations thereof. The described operations of FIGS. 1-4 may be performed by circuitry, where "circuitry" refers to either hardware or software or a combination thereof. The circuitry for performing the operations of the described embodiments may comprise a hardware device, such as an integrated circuit chip, a PGA, an ASIC, etc. The circuitry may also comprise a processor component, such as an integrated circuit, and code in a computer readable medium, such as memory, wherein the code is executed by the processor to perform the operations of the described embodiments.

Figure 5:
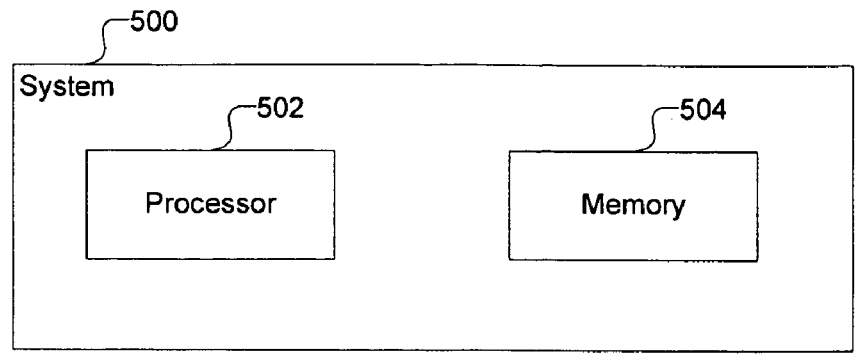
FIG. 5 illustrates a block diagram of a first system including certain elements of the computing environment of FIG. 1, in accordance with certain embodiments.

Certain embodiments illustrated in FIG. 5 may implement a system 500 comprising processor 502 coupled to a memory 504, wherein the processor 502 is operable to perform the operations described in FIGS. 2-4.

Figure 6:
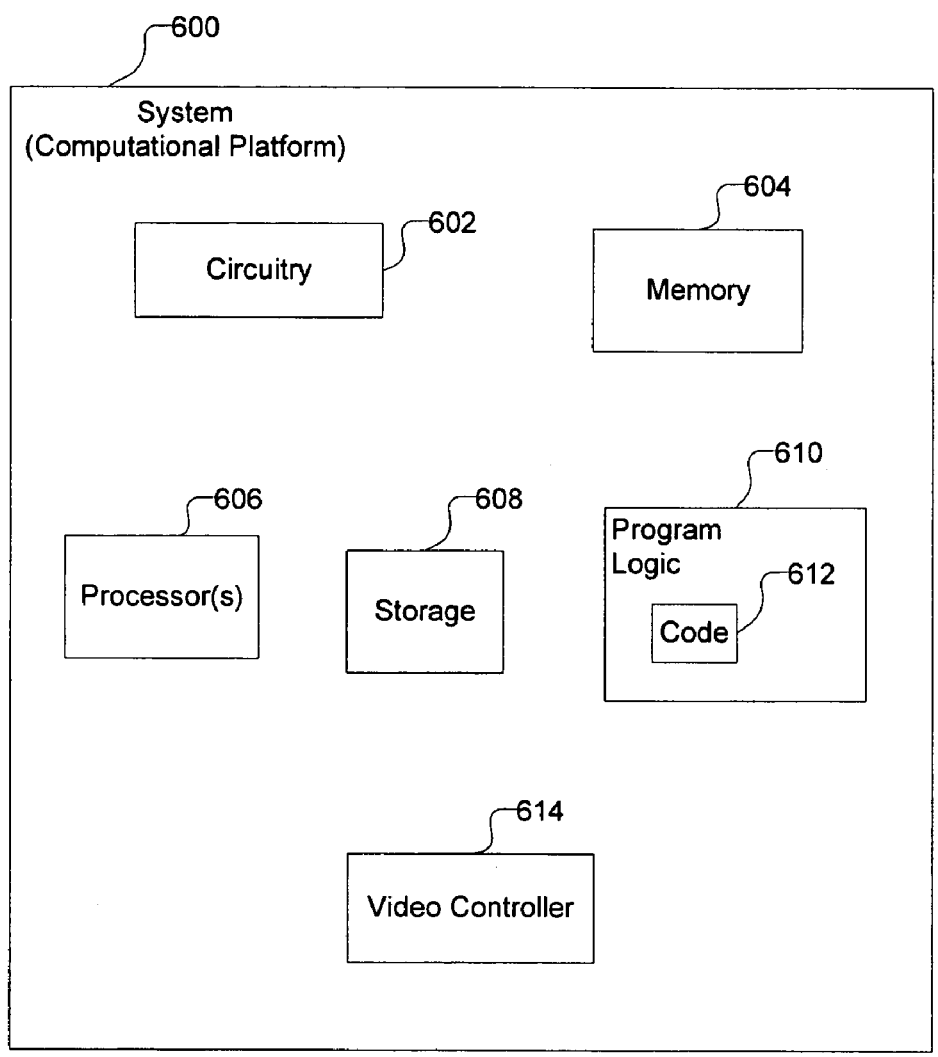
FIG. 6 illustrates a block diagram of a second system including certain elements of the computing environment of FIG. 1, in accordance with certain embodiments.

FIG. 6 illustrates a block diagram of a system 600 in which certain embodiments may be implemented. Certain embodiments may be implemented in systems that do not require all the elements illustrated in the block diagram of the system 600. The system 600 may include circuitry 602 coupled to a memory 604, wherein the described operations of FIGS. 2-5 may be implemented by the circuitry 602. In certain embodiments, the system 600 may include a processor 606 and a storage 608, wherein the storage 608 may be associated with program logic 610 including code 612, that may be loaded into the memory 604 and executed by the processor 606. In certain embodiments the program logic 610 including code 612 is implemented in the storage 608. In certain embodiments, the operations performed by program logic 610 including code 612 may be implemented in the circuitry 602. Additionally, the system 600 may also include a video controller 614. The operations described in FIGS. 2-4 may be performed by the system 600.

Certain embodiments may be implemented in a computer system including a video controller 614 to render information to display on a monitor coupled to the system 600, where the computer system may comprise a desktop, workstation, server, mainframe, laptop, handheld computer, etc. An operating system may be capable of execution by the computer system, and the video controller 614 may render graphics output via interactions with the operating system. Alternatively, some embodiments may be implemented in a computer system that does not include a video controller, such as a switch, router, etc. Furthermore, in certain embodiments the device may be included in a card coupled to a computer system or on a motherboard of a computer system.

Certain embodiments may be implemented in a computer system including a storage controller, such as, a Small Computer System Interface (SCSI), AT Attachment Interface (ATA), Redundant Array of Independent Disk (RAID), etc., controller, that manages access to a non-volatile storage device, such as a magnetic disk drive, tape media, optical disk, etc. Certain alternative embodiments may be implemented in a computer system that does not include a storage controller, such as, certain hubs and switches.

At least certain of the operations of FIGS. 2-4 can be performed in parallel as well as sequentially. In alternative embodiments, certain of the operations may be performed in a different order, modified or removed. Furthermore, many of the software and hardware components have been described in separate modules for purposes of illustration. Such components may be integrated into a fewer number of components or divided into a larger number of components. Additionally, certain operations described as performed by a specific component may be performed by other components.

The data structures and components shown or referred to in FIGS. 1-6 are described as having specific types of information. In alternative embodiments, the data structures and components may be structured differently and have fewer, more or different fields or different functions than those shown or referred to in the figures. Therefore, the foregoing description of the embodiments has been presented for the purposes of illustration and description. It is not intended to be exhaustive or to limit the embodiments to the precise form disclosed. Many modifications and variations are possible in light of the above teaching.

What is claimed is:

1. A method, comprising:
   receiving a synchronous request for reading data, wherein the synchronous request requests a first number of bytes of data;
   sending an asynchronous request to fill selected buffers of a plurality of buffers, wherein the asynchronous request requests a second number of bytes of data, wherein the second number of bytes of data is greater than the first number of bytes of data, an d wherein a number of buffers used for prefetching data is increased if a generator of the synchronous request reads at a rate faster than a rate at which the plurality of buffers are filled; and
   responding to the synchronous request with the data from at least one buffer of the plurality of buffers, wherein the synchronous request is generated by a first application and the synchronous request is received by a second application from the first application, wherein the sending and the responding are performed by the second application, and wherein the method further comprises:
   generating, by the first application, the synchronous request for reading data; and
   waiting, by the first application, until the synchronous request is responded to by the second application, wherein the asynchronous request is sent by the second application to a network stack corresponding to a network adapter that receives a stream of data, and wherein the network stack:
   receives the asynchronous request from the second application; and
   initiates the filling of the selected buffers, wherein subsequent synchronous requests from the first application are responded to by the second application from an additional amount of data that has already been fetched.

2. The method of claim 1, wherein the selected buffers are empty.

3. The method of claim 1, wherein the selected buffers have already been read.

4. The method of claim 1, wherein operations can be executed without waiting for the asynchronous request to be satisfied.

5. A system, comprising:
   memory;
   a plurality of buffers coupled to the memory; and
   a processor coupled to the memory, wherein the processor performs operations, the operations comprising:
   receiving a synchronous request for reading data, wherein the synchronous request requests a first number of bytes of data;
   sending an asynchronous request to fill selected buffers of the plurality of buffers, wherein the asynchronous request requests a second number of bytes of data, wherein the second number of bytes of data is greater than the first number of bytes of data, and wherein a number of buffers used for prefetching data is increased if a generator of the synchronous request reads at a rate faster than a rate at which the plurality of buffers are filled; and
   responding to the synchronous request with the data from at least one buffer of the plurality of buffers, wherein the system further comprises:
   a first application coupled to the memory; and
   a second application coupled to the memory, wherein the synchronous request is received from the first application by the second application, wherein the asynchronous request is sent by the second application, wherein the synchronous request is responded to by the second application, and wherein the operations further comprise:
   generating, by the first application, the synchronous request for reading data; and
   performing a waiting, by the first application, until the synchronous request is responded to by the second application, wherein the system further comprises:
   a network adapter that receives a stream of data; and
   a network stack coupled to the memory, wherein the network stack corresponds to the network adapter, wherein the asynchronous request is sent by the second application to the network stack, and wherein the network stack:
   receives the asynchronous request from the second application; and
   initiates the filling of the selected buffers, wherein subsequent synchronous requests from the first application are responded to by the second application from an additional amount of data that has already been fetched.

6. The system of claim 5, wherein the selected buffers are empty.

7. The system of claim 5 wherein the selected buffers have already been read.

8. The system of claim 5, wherein operations can be executed without waiting for the asynchronous request to be satisfied.

9. A system, comprising:
   memory;
   a video controller coupled to the memory, wherein the video controller renders graphics output;
   a plurality of buffers coupled to the memory; and
   a processor coupled to the memory, wherein the processor performs operations, the operations comprising:
   receiving a synchronous request for reading data, wherein the synchronous request requests a first number of bytes of data;
   sending an asynchronous request to fill selected buffers of the plurality of buffers, wherein the asynchronous request requests a second number of bytes of data, wherein the second number of bytes of data is greater than the first number of bytes of data, and wherein a number of buffers used for prefetching data is increased if a generator of the synchronous request reads at a rate faster than a rate at which the plurality of buffers are filled; and
   responding to the synchronous request with the data from at least one buffer of the plurality of buffers, wherein the system further comprises:
   a first application coupled to the memory; and
   a second application coupled to the memory, wherein the synchronous request is received from the first application by the second application, wherein the asynchronous request is sent by the second application, wherein the synchronous request is responded to by the second application, and wherein the operations further comprise:
   generating, by the first application, the synchronous request for reading data; and
   performing a waiting, by the first application, until the synchronous request is responded to by the second application, wherein the system further comprises:
   a network adapter that receives a stream of data; and
   a network stack coupled to the memory, wherein the network stack corresponds to the network adapter, wherein the asynchronous request is sent by the second application to the network stack, and wherein the network stack:
   receives the asynchronous request from the second application; and
   initiates the filling of the selected buffers, wherein subsequent synchronous requests from the first application are responded to by the second application from an additional amount of data that has already been fetched.

10. The system of claim 9, wherein the selected buffers are empty.

11. The system of claim 9 wherein the selected buffers have already been read.

12. The system of claim 9, wherein operations can be executed without waiting for the asynchronous request to be satisfied.

13. A computer readable storage medium having stored therein instructions that when executed by a machine causes operations, the operations comprising:
   receiving a synchronous request for reading data, wherein the synchronous request requests a first number of bytes of data;
   sending an asynchronous request to fill selected buffers of a plurality of buffers, wherein the asynchronous request requests a second number of bytes of data, wherein the second number of bytes of data is greater than the first number of bytes of data, and wherein a number of buffers used for prefetching data is increased if a generator of the synchronous request reads at a rate faster than a rate at which the plurality of buffers are filled; and
   responding to the synchronous request with the data from at least one buffer of the plurality of buffers, wherein the synchronous request is received from a first application by a second application, wherein the asynchronous request is sent by the second application, wherein the synchronous request is responded to by the second application, and wherein the operations further comprise:
   generating, by the first application, the synchronous request for reading data; and
   performing a waiting, by the first application, until the synchronous request is responded to by the second application, wherein the asynchronous request is sent by the second application to a network stack corresponding to a network adapter that receives a stream of data, and wherein the network stack:
   receives the asynchronous request from the second application; and
   initiates the filling of the selected buffers, wherein subsequent synchronous requests from the first application are responded to by the second application from an additional amount of data that has already been fetched.

14. The computer readable storage medium of claim 13, wherein the selected buffers are empty.

15. The computer readable storage medium of claim 13, wherein the selected buffers have already been read.

16. The computer readable storage medium of claim 13, wherein operations can be executed without waiting for the asynchronous request to be satisfied.

* * * * *

UNITED STATES PATENT AND TRADEMARK OFFICE
CERTIFICATE OF CORRECTION

PATENT NO. : 7,581,045 B2
APPLICATION NO. : 11/152856
DATED : August 25, 2009
INVENTOR(S) : J. A. Wiegert et al.

Page 1 of 1

It is certified that error appears in the above-identified patent and that said Letters Patent is hereby corrected as shown below:

In the Claims:

Column 7, Line 57, "data, an d wherein" should read --data, and wherein--

Signed and Sealed this
Nineteenth Day of May, 2015

Michelle K. Lee
*Director of the United States Patent and Trademark Office*